A. SAVARESE.
COMPOSING MACHINE.
APPLICATION FILED JAN. 23, 1907.
920,086.
Patented Apr. 27, 1909.
8 SHEETS—SHEET 2.
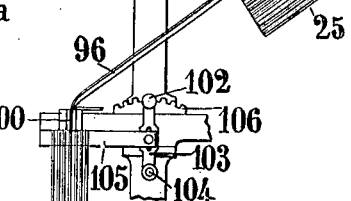
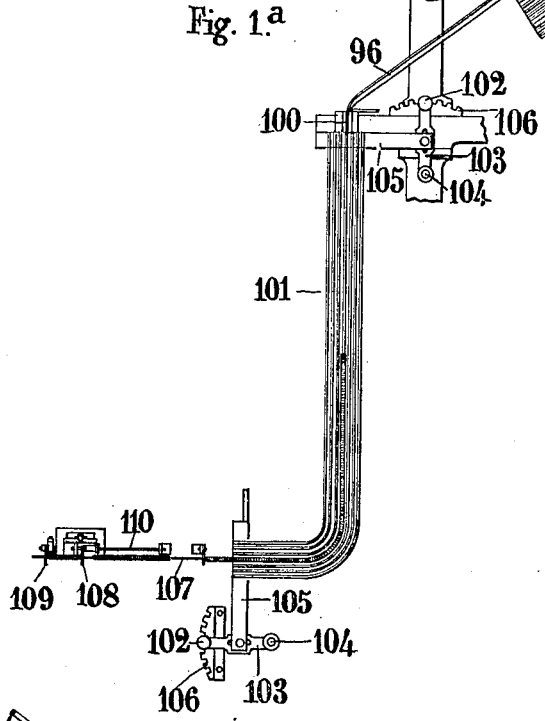
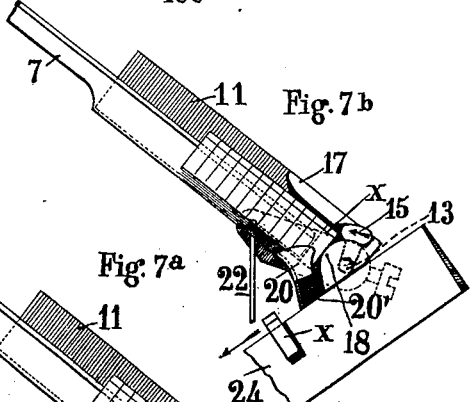
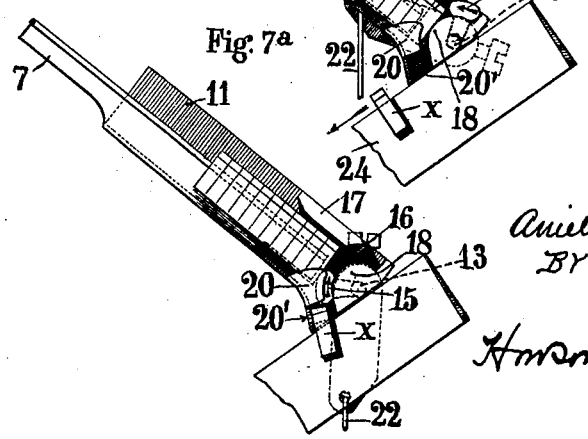
WITNESSES
INVENTOR
ATTORNEYS

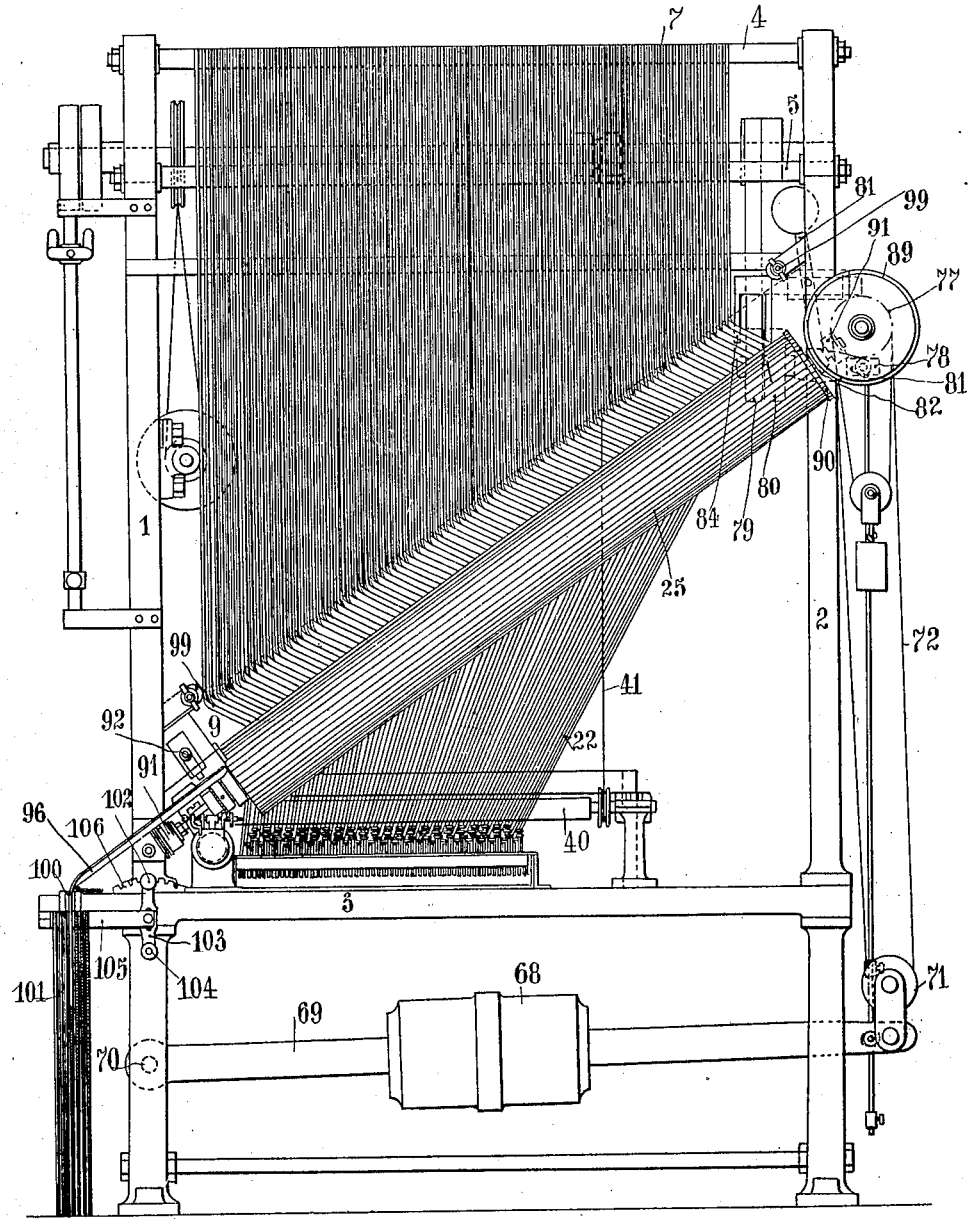

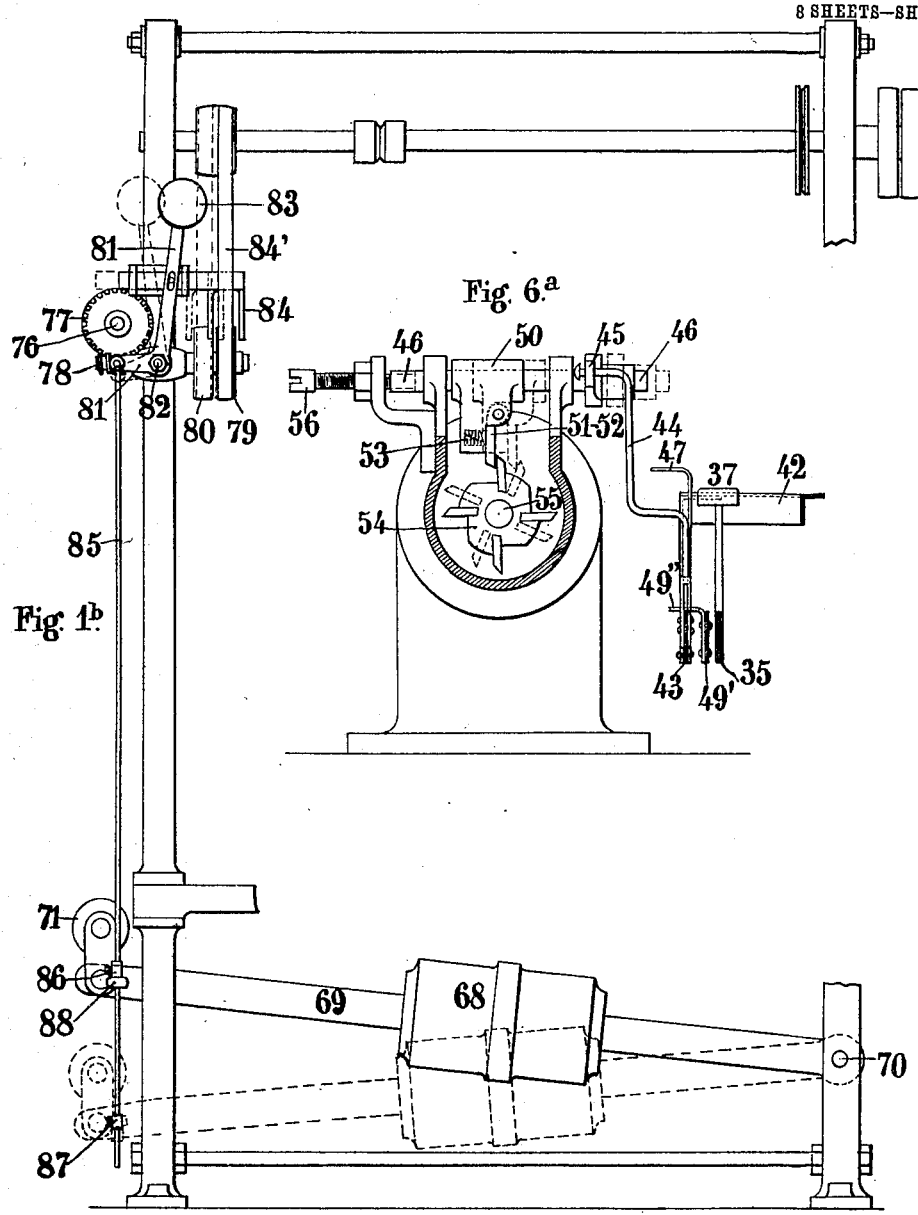

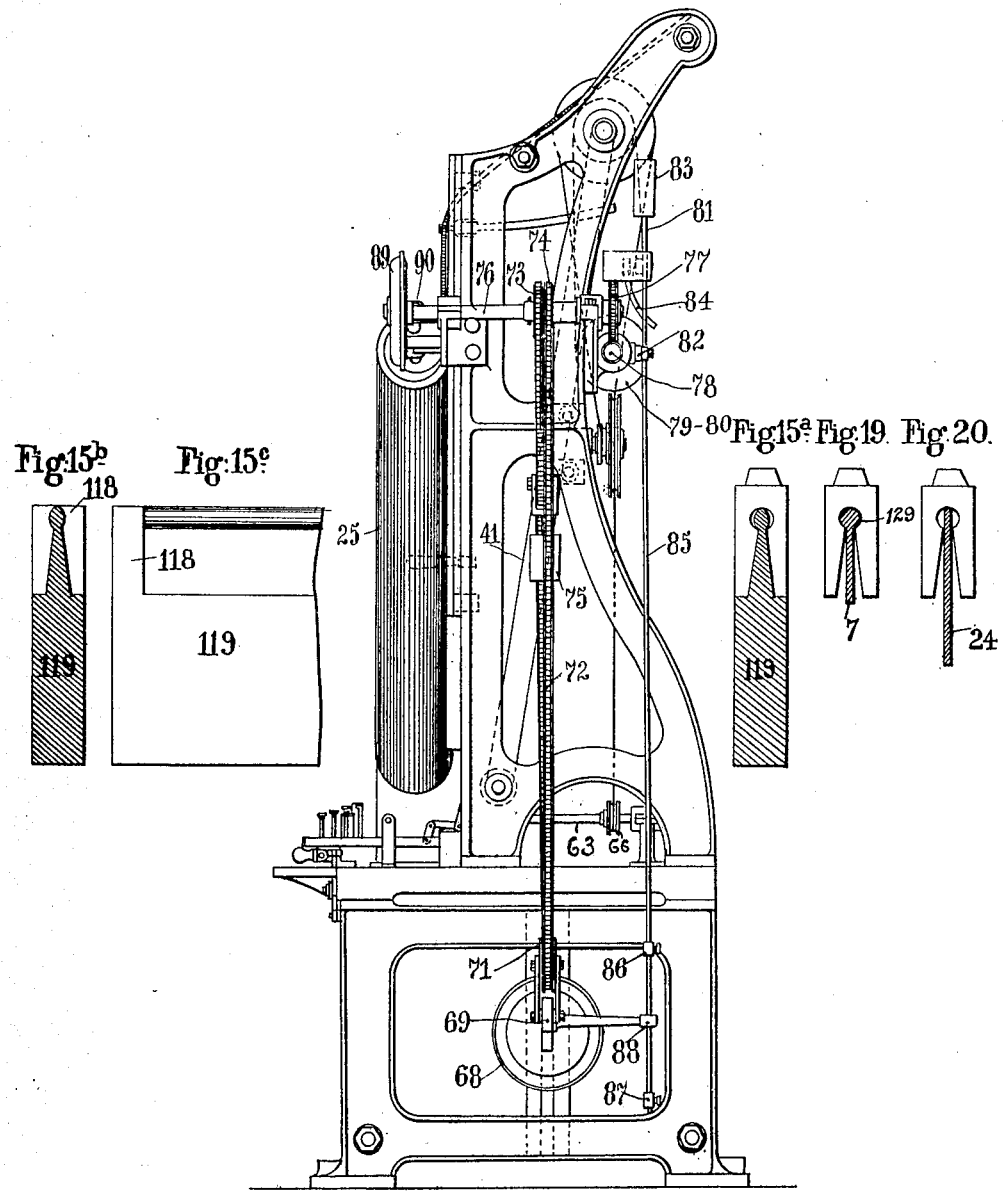

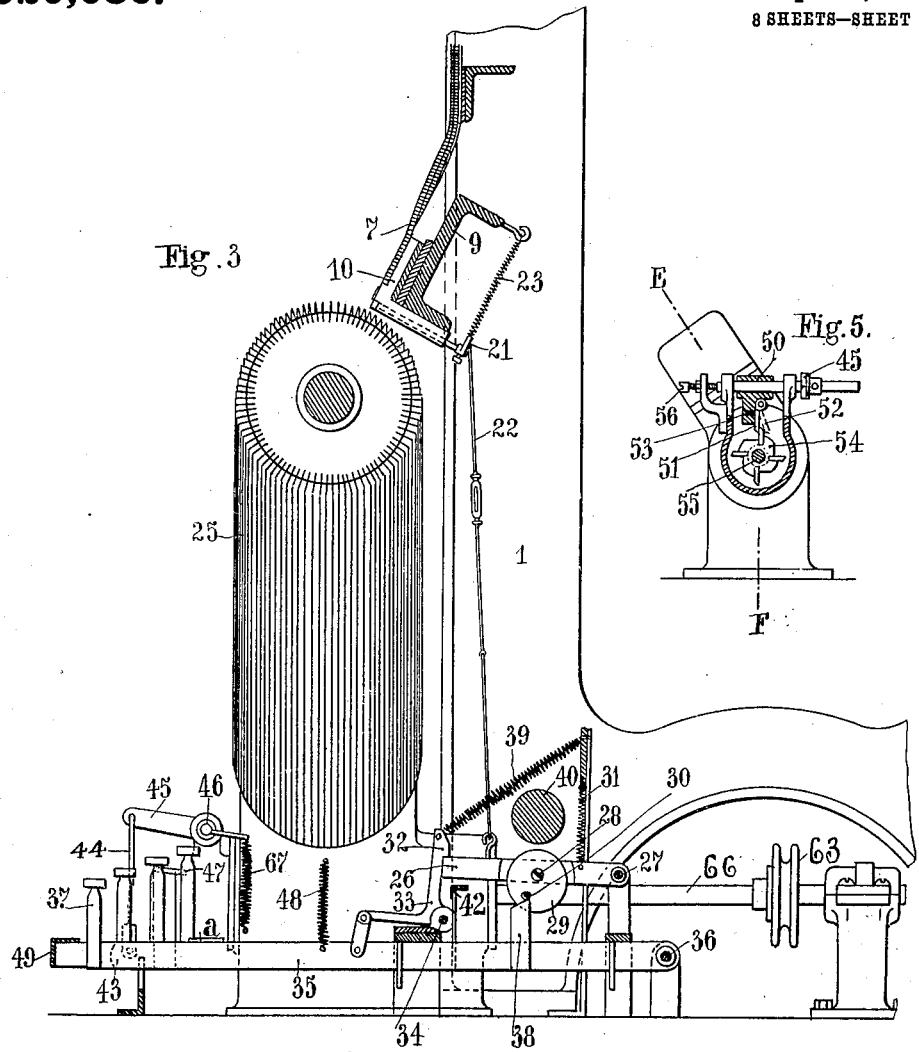

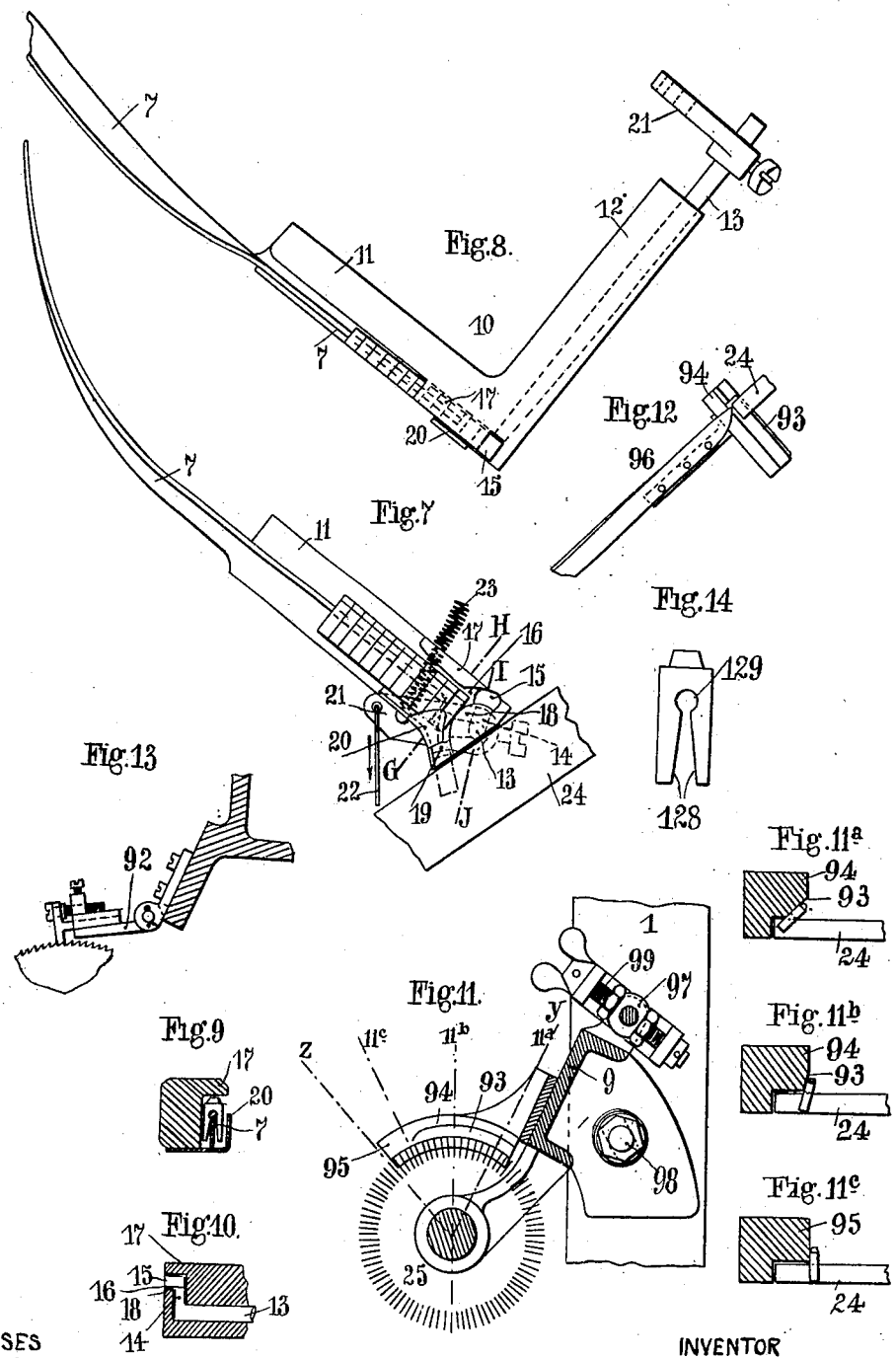

A. SAVARESE.
COMPOSING MACHINE.
APPLICATION FILED JAN. 23, 1907.
920,086.
Patented Apr. 27, 1909.
8 SHEETS—SHEET 7.
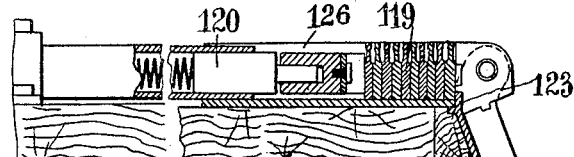
Fig. 16.
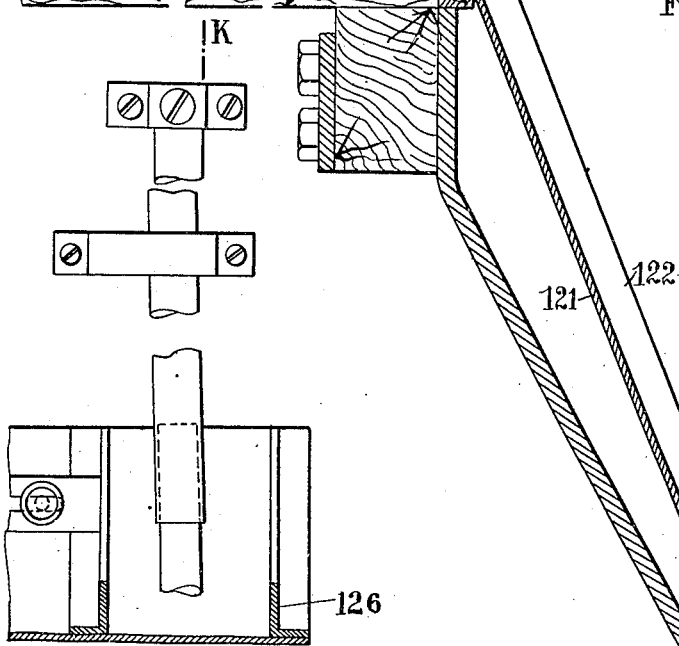
Fig. 15.
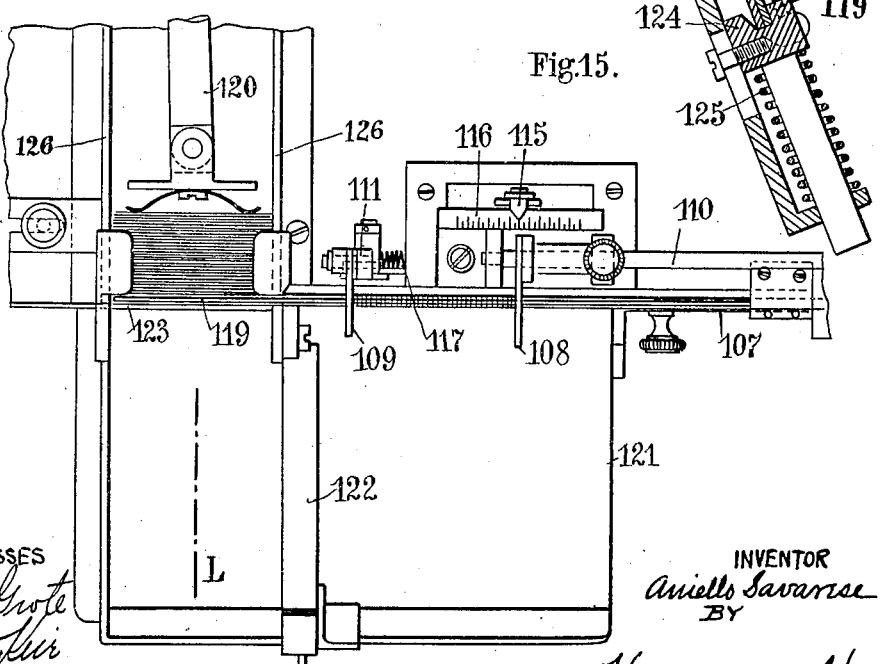
WITNESSES
L. H. Grote
W. E. Keir
INVENTOR
Aniello Savarese
BY
Howson and Howson
ATTORNEYS A. SAVARESE.
COMPOSING MACHINE.
APPLICATION FILED JAN. 23, 1907.
920,086.
Patented Apr. 27, 1909.
8 SHEETS—SHEET 8.
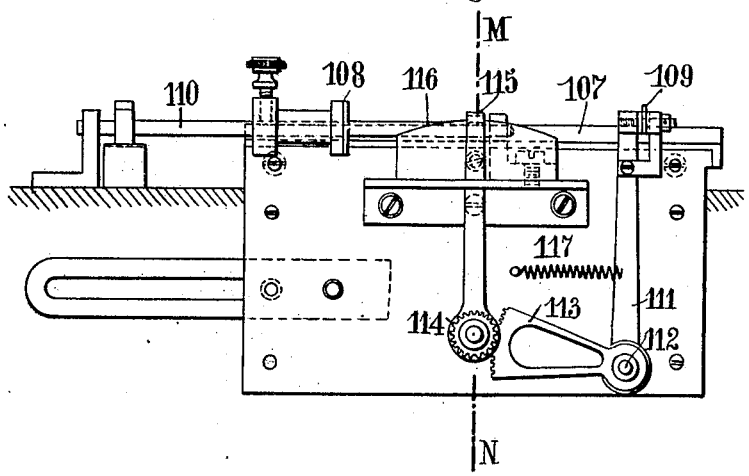
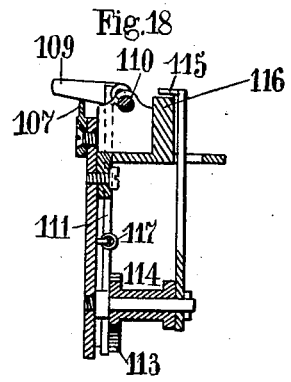

UNITED STATES PATENT OFFICE.

ANIELLO SAVARESE, OF PARIS, FRANCE.

COMPOSING-MACHINE.

No. 920,086.  Specification of Letters Patent.  Patented April 27, 1909.

Application filed January 23, 1907. Serial No. 353,634.

*To all whom it may concern:*

Be it known that I, ANIELLO SAVARESE, a subject of the King of Italy, and residing at 3 Rue Taitbout, Paris, France, have invented a certain new and useful Improvement in Composing-Machines, of which the following is a full, clear, and exact description, and for which I have applied for Letters Patent in France, No. 363,355, dated February 17, 1906.
This invention has reference to improvements in composing machines in which the types, formed as riders, slide upon the rails and upon rods throughout their travel through the machine. A machine of this character is illustrated in the Chateau patent 637,086, November 14, 1899.

These improvements relate to modifications in the means for the selection of the type, the control and regulation of the rotation of the type conveying cylinder, and to other parts of the machine as will be hereinafter set forth.

My improvements result in the construction of a simple, and convenient composing machine, which is also both quick working and certain in its action.

The improved composing machine is represented upon the accompanying drawings in which:—
Figure 1 shows the whole of the machine in front elevation; Fig. 1ª is a front elevation of the justifier and the collector rails for receiving the type from the conveying cylinder; Fig. 1ᵇ is a partial rear elevation of the machine showing more particularly the arrangement of the weighted lever 69; Fig. 2 is a side view, showing more particularly the driving arrangement by means of a counterweight with automatic lift for the rotation of the cylinder; Fig. 3 shows on a larger scale and in cross section the arrangement of the keyboard, and the control of the type magazine discharge and the type conveying cylinder; Fig. 3ª is a broken perspective of portion of the keyboard; Figs. 4, 5 and 6 show respectively, in transverse section on lines A—B and C—D of Fig. 6 and longitudinal section on lines E—F of Fig. 5, the arrangement for revolving the conveying cylinder; Fig. 6ª is a vertical section of the same on a larger scale showing the operative connections to the escapement device from the keyboard; Figs. 7, 8, 9 and 10 show respectively in front and side view and in section on lines G—H and I—J of Fig. 7 the mechanism for distributing the type from the magazine rail upon the rods or plates of the conveying cylinder; Fig. 7ª and 7ᵇ are broken front elevations showing the type hammer in different positions; Figs. 11 and 12 show in cross section the base of the cylinder, as well as the regulating arrangement radial with the axis of the cylinder, and the stop which collects the type; Figs. 11ª, 11ᵇ and 11ᶜ are cross sections of the stop 94 showing the position of type on blades 24 at different points in its length; Fig. 13 shows in side view one of the retaining pawls of the plate cylinder; Fig. 14 shows the preferred shape of the type; Figs. 15 and 16 show in plan and in cross section (on line K—L of Fig. 15) the apparatus intended for correcting, justifying and paging purposes; and Figs. 15ª and 15ᵇ are respectively cross sections of the supporting rail 119 with and without a type mounted thereon, while Fig. 15ᶜ is a side elevation of one end of said rail; Figs. 17 and 18 show in elevation, seen from the rear and in cross section (on line M—N) the spacing apparatus for justifying the line; Fig. 19 is a cross section of a magazine rail with type mounted thereon; and Fig. 20 is a cross section of a blade on the conveying cylinder 25 showing a type astride the same.

The parts of the machine are arranged upon a frame composed of two uprights 1, 2, erected upon a table 3 and connected by cross bars 4 and 5 (Figs. 1 and 2). The magazine is composed of rails 7 fixed upon the cross bars 4 and 5, having a head for engaging the groove 129 in the type as shown clearly in Figs. 9 and 19 (see also Fig. 14); the base of each of these magazine-rails is inclined and supported by a channel shaped bar 9 (Fig. 3), seated at its extremities in the uprights 1 and 2 (Fig. 11) and carrying the ejectors.

The ejectors are each composed (Figs. 7 to 10) of an elbow piece 10 upon the arm 11 of which is fixed the base of the magazine rails 7, while in the arm 12 is socketed a spindle 13. The end of this spindle opposite the base of the magazine rail 7 is cranked (Fig. 10) to form the arm 14, the extremity of which is in turn angled to form the hammer or ejector proper 15, which is of the approximate thickness of a type. Upon the actuation of the spindle 13 the ejector 15 is oscillated through an arc around the curved abutment 18, between the latter and the lower extremity of the stop 17 at one end and the base of the magazine rail at the other. The magazine rail is spaced approximately the thickness of one type from the abutment 18 so that the bottom type, which is adjacent the abutment, is held in place solely by the weight of the type column on the rail 7. This type is therefore subject to the action of the ejector and upon the actuation of the latter is shoved from its position at the base of the type column and delivered to the rod or blade 24 of the conveying cylinder 25, being guided through the passage 19 by the check plate 20, the wall $20^1$ of which holds the type stationary in its position astraddle the blade 24 until the conveying cylinder is rotated. When the latter occurs the type is carried free of the check plate 20 and slides down the blade to the collector rail 96 (Fig. $1^a$) which will be referred to again later.

The blades 24 (see Fig. 20) are preferably without a bead so that the type may slide perfectly freely. The collector rail 96, except for the portion adjacent the cylinder 25, has a bead which engages the notch 129 of the type in the same manner as the rails 7 (Fig. 19) of the magazine.

The ejector 15 which, as has been previously stated, is approximately the thickness of a type, is more or less elongated, so that after having pushed the bottom type from its position at the base of the type column, it remains interposed between the type on the magazine rail 7 and the abutment 18 and thus sustains the type column until it i. e. the ejector has been returned to its original position, when the column drops against the abutment, and the next type is in position to be delivered to the conveying cylinder in the same manner. The return movement of the ejector in frictional contact with this type does not displace the same from the magazine rail, as the type is retained by the stop 17 on the arm 11, this stop being spaced a sufficient distance from the magazine rail 7 to leave ample clearance for the downward movement of the type while at the same time preventing their displacement by the return movement of the ejector in frictional engagement therewith.

The ejector is operated in one direction from the keyboard in a manner to be explained, through a pull wire 22 (Fig. 3) secured to the crank 21 on the end of the spindle 13 and in the other direction by the return spring 23. It is only when the ejector has been returned to its original position under the influence of the spring 23 that the conveying cylinder 25 is rotated and the type $x$ escapes the check plate 20.

The connection between each of the keys 37 or the spacing bar 49 and the wire 22 leading to the ejector mechanism, is established (Fig. 3) through the levers 35 or $49^1$ pivoted at 36 and a bell crank lever 33 pivoted at 34, one arm of which is connected through a link with the levers 35, $49^1$ and the other arm of which is provided with a nose 32 which, under the action of the spring 39 is normally maintained hooked over the end of a lever 26 to which the wire 22 is secured. The lever 26 which is pivoted at 27 carried an eccentrically mounted disk 29 provided with milled edge and a screw stop 30. Above the lever 26 is arranged a cylinder 40 which is constantly rotated by the chain 41 (Fig. 2) from the general driving device. Under the influence of the springs 31 to which the lever 26 is subjected, the cam 29 is lifted into contact with the cylinder 40 when the depression of lever 35 or $49^1$ withdraws the nose 32 from its engagement with the extremity of the lever 26. The cylinder 40 acting through the eccentric disk 29, depresses the lever 26 and thereby pulls the wire 22 to actuate the ejector 15. When the disk lever 26 has been depressed a sufficient distance by the rotation of the cam disk the nose 32 slips over the end and prevents it from rising under the influence of the spring 31 as the disk continues to rotate. The latter freed thereby from its engagement with the roller 40 continues to turn under the impetus imparted thereto until brought to rest by the impingement of the stop pin 30 against the stop finger 38 carried by the key lever 35.

While the actuation of the ejector mechanism is secured by the arrangement just described, the rotation of the conveying cylinder 25 is simultaneously accomplished by the following arrangement. Under the extremity of the lever 26 is arranged a cross bar 42 (Figs. 3 and $3^a$) which is subjected to the action of the lever 26 on its downward travel under the influence of rotating cam disk 29 after a key lever 35 has been actuated. This cross bar 42 is fast at its two extremities to levers 43 pivoted at 36 and provided with a return spring 48. These levers 43 have no corresponding magazine rail and are employed solely for effecting the rotation of the conveying cylinder. While actuated as just stated, upon the depression of each key lever 35 or by the lug $49^{11}$ (Fig. $3^a$) on the space bar lever $49^1$ they may be independently operated by means of keys 47 secured thereto, so as to rotate the conveyer cylinder without actuating any ejector mechanism whatsoever. To one of these levers 43 is jointed a wire 44 the other end of which is connected to the lever 45 secured to the spindle 46.

A spring 67 supplements the effort of spring 48 and tends to return the spindle to position after it has been oscillated through the levers 43. The spindle 46 extends to an escapement mechanism (Figs. 5 and 6) which controls the means for rotating the cylinder 25. This mechanism comprises an anchor escapement 50 consisting of two pawls, one of which 51 is fixed and the other 52 is movable and acted upon by a spring 53. Normally one of the teeth of the ratchet wheel 54 mounted on the spindle 55, bears against both of these pawls. Upon the oscillation of the spindle 46 by the depression of the lever 43 the escapement is oscillated so that the movable tooth 52, under the action of its spring 53, escapes the ratchet tooth 54 (taking the position shown in dotted lines Fig. 5) and the latter remains engaged only with the fixed tooth 51. Upon the return oscillation of the spindle 46, the time of which is determined by the rotation of the cam disk 29, the ratchet tooth 51 is also moved from engagement with the ratchet wheel 54 and the latter with its spindle 55, is free to turn under the influence of mechanism about to be explained. To adjust the position of the escapement 50 with relation to the ratchet 54 a screw 56 (Fig. 5) is provided by which the spindle may be moved longitudinally.

The spindle 55 which is journaled in ball bearings 57 and passes through an oil bath 58 (Figs. 4 and 6), is furnished with a worm 59 meshing with a worm wheel 60 on the shaft of the cylinder 25. It is also provided with a friction disk 51 in contact with another disk 62 longitudinally movable on the end of a shaft 63, by a pin and slot connection 64. A spring 65 constantly acts on this plate or disk to tend to cause it to make frictional contact with the disk 61. The shaft 63 is continuously rotated by a cable or chain passing over a pulley 66 (Figs. 2 and 3) and driven from the general driving control. Thus when the ratchet wheel 54 is freed from the escapement 50, the spindle 55 under the influence of the friction disks 61 and 62 is rotated a quarter of a turn (there being four teeth on the ratchet 54) and the conveying cylinder 25 is consequently rotated through the gear of the worm wheel 60 with the worm 59 on the spindle 55, so as to present the next rod 24 upon the conveying cylinder 25 in position to receive the next type displaced by an ejector. This rotation of the conveying cylinder is assisted by a counter weight 68 (Figs. 1, 1$^b$ and 2) which serves to take up the inertia of the cylinder 25 and thus insure its instantaneous rotation by the gear with spindle 55 as just explained. This counterweight is mounted on a bar 69 one end of which is pivoted at 70 to the upright of the framework. The free end of the bar is suspended by means of a pulley 71 from a chain 72 passing around two wheels 73, 74 and from which is suspended a weight 75. The wheel 73 is fixed to a shaft 76 on the end of which is mounted a bevel wheel 89 gearing with a bevel pinion 90 fixed to the end of the spindle of the conveying cylinder 25 which is journaled on ball bearings 91. The weight 68 thus exerts a continuous torsional effort through this connection upon the conveying cylinder 25, which is free to rotate as soon as the ratchet mechanism 50 above described is actuated by the depression of a key 37. A check pawl 92 at each end of the cylinder prevents any backward rotation of the latter.

The weight 68 is raised by means of the wheel 74 mounted at the end of a loose sleeve upon the shaft 76, the extremity of this sleeve being fast to a worm wheel 77 engaged by a worm 78 on the same shaft with loose and fast pulleys 79, 80 driven by a belt 84$^1$ from the general motive power. A bell-crank lever 81 is jointed at 82 (Figs. 1 and 1$^b$) and has a counterweight 83 and is connected to a belt shifter 84. This lever 81 is also connected to a vertical rod 85, furnished with two stops 86, 87, between which slides an arm 88 fast to the end of the bar 69. When the descent of the weighted bar 69 brings this arm 88 into contact with the lower stop, the driving belt will be shifted from the loose pulley 79 to the fast pulley 80 and then the weighted bar will be automatically lifted again until the arm 88 striking the upper stop 86, will cause the belt to be shifted back to the loose pulley 79.

The type distributed on the blades 24 of the cylinder slide to the bottom of the latter and come to rest against the inclined plane 93 of a stop 94, Fig. 11, mounted on the lower end of the channel bar 9. As the cylinder 25 rotates these type travel the length of the said stop 94 against its inclined plane which rises progressively, see Figs. 11$^a$, 11$^b$ and 11$^c$ to bring the type perpendicular to the rule 24 when it comes toward the extremity 95 of this stop 94 and thus be in suitable position to slide into the collecting rail. At this extremity is fixed a collecting rail 96 (Figs. 1 and 12), of which the end is thinned and smooth and situated in line with the rod 24 situated immediately beyond the extremity of the stop 94. In Fig. 11 the line $y$ indicates the plane of fall of the type from the magazines on to the cylinder 25 and the line $z$ indicates the plane of collection by the rail 96.

Figs. 1 and 11 also show an arrangement which allows the plane of fall from the ejectors to be exactly regulated with the angular position of the corresponding rod of the conveying cylinders. This arrangement comprises a nut 97 journaled between two ears on the bar 9, which is fixed at its ends to the uprights 1 and 2 of the framework by means of a nut and lock-nut 98, of which the bolt passes through an elongated hole concentric with the axis of the cylinder 25. This bar 9 is also journaled at its extremities upon the axle of the cylinder in such a manner as to insure its displacement with regard to the radius of the cylinder. After having slacked the nuts 98, the adjustment can be obtained mathematically by acting on two micrometer screws 99, one at each end of the bar 9, upon which the nuts 97 can be screwed. When the adjustment is obtained the position of the bar is insured by locking the nuts and lock nuts 98. Another arrangement also allows of regulating the position on the rod or blade 24 below the magazines. It consists (Fig. 5) in acting upon the screw 56 in order to advance or to draw back the anchor escapement 50, which permits of the position of the cylinder rod being regulated, which position should coincide with the plane of fall from the magazines.

The extremity of the collector rail 96 (Figs. 1 and 1ª) is fixed at 100 upon the table 3. I have also represented rails 101, carrying types and rails without types. These rails are filled through the medium of the collecting rail 96 which meshes the types in proportion as they escape from the end 95 of the stop 94 and the blades 24 of the cylinder 25. When a rail 101 is filled with words formed by the machine the filling rail is brought opposite the extremity of the rail 96 to receive the necessary words of the composition. In front of this extremity can be moved the extremities of the collector rails 101, each of which can be brought into line with the rail 96 by means of a spring thumb-piece 102, jointed to the end of a lever 103 pivoted at 104. To this lever 103 is connected by a slide the bar 105, upon which are fixed the extremities of the collector rails 101, this bar 105 being mounted on a slide in the table 3. The thumb piece 102 moves over a sector 106, in the notches of which it may be maintained to insure the position of the rail 101 in prolongation of the rail 96.

The collector rails 101 which are curved at their lower ends into a plane practically at right angles to their upper ends lead the type to the form for correcting, justifying and paging. At the base of these rails is provided the same arrangement as at their upper part, which permits of their being brought successively opposite a smooth rail 107 (Figs. 1ª and 18), upon which the corrections and justifying are effected. This rail has no bead, in order to permit of the easy removal and replacement of the types.

Justifying is effected by means of an apparatus composed of two fingers 108, 109 (Figs. 15, 17 and 18), arranged above the justifying smooth rail 107; the one 108 is fixed in an adjustable manner upon an oscillating spindle 110, which may if desired be furnished with a scale indicating lengths of lines predetermined. The finger 109 is jointed to the end of a lever 111, oscillating at 112 and controlling, by means of a sector 113 and a pinion 114, an index 115, which moves in front of a scale 116 (Fig. 15). The lever 11 is recalled toward the index 115 by a spring 117. The finger 108 having been turned up out of the way, a number of words corresponding approximately to the length of the line are allowed to slide onto the justifying rail 107, pushing the finger 109 back until the other end of the line has passed the finger 108. The latter is then dropped behind this end of the line and the whole is made snug by the action of the spring 117 which pulls the finger 109 toward the finger 108. The line is then corrected, if necessary, and the index 115 indicates the length of the line over or under; suitable spaces are taken out or added, until the index indicates zero, that is to say, correct justifying. The line thus justified is then pushed upon the line supporting rail 119, (Fig. 15ª) which is of substantially the same length as the line of type to be carried thereby one being supplied for each line of type and having a thinned or reduced bead preventing the types escaping of themselves, but always allowing them to be removed by force, as by means of a pincers device, the legs of the type acting somewhat as a spring to allow them to escape the reduced bead which enables corrections to be made up to the press. Each rail support 119 has at one of its extremities a heel stop 118 Figs. 15ᵇ–15ᶜ against which one end of the line of types abuts, so that a line may be safely carried by merely inclining it with the heel stop 118 at the lower end.

The rail supports 119 are fitted between the side walls 126 (Figs. 15 and 16) of a trough 127 and are pushed against the end flange 123 of said trough by a spring piston 120, said end flange being located so that the first rail support is always in line with the justifying rail 107. The lines thus composed are arranged in any suitable manner upon an inclined plate 121 (Fig. 16). A rod 122, adjustable according to the length of the lines, maintains them upon the plate, which thus forms the paging device. This plate is arranged between two abutments or stops 123 and 124, of which the one 124 is maintained by a coiled spring 125 (Fig. 16). It is sufficient, then, when this plate is full of lines, to compress the spring 125 in order to disengage this plate, and to transport the composed matter which it contains.

Fig. 14 shows the special form of the type character employed with the machine which has been described above. The height of the type is such that its center of gravity is sufficiently low to insure a perfect stability of the type on the rods of the cylinder, which is very important in order that in sliding obliquely on these rods it may not escape. The notch of this type is formed of two inclined portions 128, converging toward a circular portion 129 which is a continuation of the notch and joins with it. This circular portion 129 is of a diameter slightly greater than the head of the magazine rails 7, the collecting rail 96 and the collecting rails 101. The spacing apart of the inclined portions 128 is such that it permits a type to fall with certainty astride of the rod of the cylinder without its lower portion resting on the cylinder or its being thrown out. These inclined planes 128 permit, as has been described, the introduction of the type astride the supporting rail of the line, the head of which is thinned down, the type engaged by this lower part upon this thinned portion which slightly spreads apart the legs of the type in order that the thin portion may pass into the circular portion of the type and then to impress the head to prevent the type from escaping.

I claim as my invention—

1. In a composing machine, a type magazine rail, a stop distant from the lower end of said rail the thickness of a type, an ejector oscillating in an arc between said stop and magazine rail to eject a type held against said stop by the type column above the same, together with a stop arranged beside said type column to prevent the displacement of the type therein by the frictional engagement of said ejector therewith on its return stroke, together with a conveying cylinder having slide blades down which said type travel by gravity to a collector and means for guiding said type from the ejector to said slide blades, substantially as described.

2. In a composing machine, a type magazine rail, a curved stop distant from the lower end of the latter the thickness of a type, an ejector oscillating in an arc between said stop and magazine rail to eject a type held against stop by the type column above the same, together with a stop arranged beside said type column to prevent the displacement of the type therein by the frictional engagement of said ejector therewith on its return stroke, substantially as described.

3. In a composing machine, a type magazine rail, a stop distant from the lower end of the latter the thickness of a type, an ejector oscillating in an arc between said stop and magazine rail to eject a type held against said stop by the type column, said ejector being of substantially the thickness of a type and being shaped to sustain the type column in place of a type displaced thereby, together with means to prevent the displacement of any type in the type column during the return movement of said ejector in frictional engagement with the bottom type, together with a conveying cylinder having slide blades down which said type travel by gravity to a collector and means for guiding said type from the ejector to said slide blades, substantially as described.

4. The combination of the type magazines of a composing machine, and an intermittently rotating conveying cylinder with key levers and means operated by the keys to control the supply of type to the cylinder and also the rotation of the cylinder, said controlling means including levers carrying rotary cams and operatively connected to the ejector, a positively driven cylinder to act on the cams, catches for the cam levers means for freeing the same by the actuation of the key levers and stops on the latter to control the rotation of the cam, substantially as described.

5. In a composing machine, a type magazine and a cylinder provided with a plurality of slide rods down which the type are adapted to travel to an assembling device, in combination with means to intermittently rotate said cylinder so as to present its slide rods successively to the type magazine, said means comprising a member driven from the general driving means for the machine and applied to one end of said cylinder together with a counterweight member applied to the other end of said cylinder to overcome its inertia and assure its prompt actuation by the said driven member and a ratchet mechanism controlled from the keyboard, to govern the rotation of said cylinder by said means, substantially as described.

6. In a composing machine, a type magazine and a cylinder provided with a plurality of slide rods down which the type are adapted to travel to an assembling device, in combination with means to intermittently rotate said cylinder so as to present its slide rods successively to the type magazine, said means comprising a member gearing with one end of the cylinder and subjected to a continual frictional drive from the operating mechanism of the machine, together with a counterweight member applied to the other end of said cylinder to overcome its inertia and assure its prompt actuation by the said driven member and a ratchet mechanism controlled from the keyboard, to govern the rotation of said cylinder by said means, substantially as described.

7. In a composing machine, a type magazine and a cylinder provided with a plurality of slide rods down which the type are adapted to travel to an assembling device, in combination with means to intermittently rotate said cylinder so as to present its slide rods successively to the type magazine, said means comprising a member driven from the general driving means from the machine and applied to one end of said cylinder together with a counterweight member applied to the other end of said cylinder to overcome its inertia and assure its prompt actuation by the said driven member and a ratchet mechanism controlled from the keyboard, to govern the rotation of said cylinder by said means, together with means automatically operated by said counterweight member for raising the same after a predetermined downward travel, substantially as described.

8. The combination of the type magazine, of a composing machine, with a rotary conveying cylinder, a friction driven motor at one end to rotate the cylinder, a counterweight at the other end to overcome inertia, an escapement to prevent the cylinder from turning; and key levers to release the escapement.

9. The combination of the type magazines of a composing machine and a rotary conveying cylinder having rods along which the type may slide, with ejectors for displacing the types from the magazines, a bar carrying the ejectors and means for adjusting the position of said bar with relation to the cylinder rods.

10. In a composing machine of the character described, a rotary conveying cylinder provided with slide rails, a type magazine and means for delivering type therefrom to said conveying cylinder, in combination with a pinion fast with said cylinder, an escapement wheel and a worm fast therewith gearing with said pinion together with detents engaging said wheel and means for adjusting the position of said detents to regulate the positions of the slide rails on said conveying cylinder with relation to the type delivering device, substantially as and for the purpose described.

11. In a composing machine, a type magazine rail, a stop distant from the lower end of said rail the thickness of a type, an ejector oscillating between said stop and magazine rail to eject a type held against said stop by the type column above the same together with a stop arranged beside said type column to prevent the displacement of the type therein by the frictional engagement of said ejector therewith on its return stroke, in combination with a conveying cylinder provided with rails or blades to receive the type displaced by the ejector and a guide to direct the type from the magazine to the conveying cylinder, substantially as described.

In testimony whereof I have signed my name to this specification, in the presence of two subscribing witnesses.

ANIELLO SAVARESE.

Witnesses:
GUSTAVE DUMONT,
LOUIS BEMELMANN.